(12) United States Patent
Bauer

(10) Patent No.: US 12,376,597 B2
(45) Date of Patent: Aug. 5, 2025

(54) METHOD OF SPIRALLY CUTTING MEAT SLICES

(71) Applicant: HOLLYMATIC CORPORATION, Countryside, IL (US)

(72) Inventor: Erik Bauer, Alto, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 1423 days.

(21) Appl. No.: 15/503,219

(22) PCT Filed: Mar. 10, 2016

(86) PCT No.: PCT/US2016/021684
§ 371 (c)(1),
(2) Date: Feb. 10, 2017

(87) PCT Pub. No.: WO2016/145141
PCT Pub. Date: Sep. 15, 2016

(65) Prior Publication Data
US 2017/0223974 A1    Aug. 10, 2017

Related U.S. Application Data

(60) Provisional application No. 62/130,739, filed on Mar. 10, 2015.

(51) Int. Cl.
*A23P 30/00* (2016.01)
*A22C 17/00* (2006.01)
*A23L 13/00* (2016.01)
*A23L 13/60* (2016.01)
(Continued)

(52) U.S. Cl.
CPC ...... *A22C 17/0033* (2013.01); *A22C 17/0006* (2013.01); *A22C 17/002* (2013.01); *A23L 13/00* (2016.08); *A23L 13/62* (2016.08); *A23L 13/67* (2016.08); *A23P 30/00* (2016.08);
(Continued)

(58) Field of Classification Search
CPC .... A22C 17/0006; A22C 17/002; A23L 13/67
See application file for complete search history.

(56) References Cited

U.S. PATENT DOCUMENTS 265,735  A  *  10/1882  Baxter .................. A22C 17/10
                                                           426/87
1,598,951 A  *  9/1926  Wright ............... B65D 75/5888
                                                           426/87
(Continued)

FOREIGN PATENT DOCUMENTS

CN         1836572 A      9/2006
JP       2001-157565 A    6/2001

OTHER PUBLICATIONS https://www.royalbaconsociety.com/worlds-longest-bacon/ , 2008.*
(Continued)

*Primary Examiner* — Viren A Thakur
(74) *Attorney, Agent, or Firm* — Sughrue Mion, PLLC

(57) ABSTRACT

A method of cutting a meat portion to make a plurality of meat slices according to exemplary aspects includes cutting the meat portion in a planar spiral pattern, thereby creating an elongated strip, wherein the planar spiral pattern comprises a curve on a two-dimensional plane coincident with a substantially planar surface of the meat portion.

5 Claims, 6 Drawing Sheets

(51) Int. Cl.
 B65B 25/06 (2006.01)
 B65B 63/04 (2006.01)
(52) U.S. Cl.
 CPC ............ B65B 25/065 (2013.01); B65B 63/04 (2013.01); *A23V 2002/00* (2013.01)

(56) References Cited

U.S. PATENT DOCUMENTS

| | | | | |
|---|---|---|---|---|
| 2,352,617 | A | * | 7/1944 | Cohen .................... A21C 3/065 426/501 |
| 2,415,747 | A | * | 2/1947 | Krilow .................... B26D 3/11 408/214 |
| 2,470,078 | A | * | 5/1949 | Hoenselaar ............. B26D 3/11 83/374 |
| 2,830,910 | A | * | 4/1958 | Swanson ................ B65D 75/46 206/820 |
| 3,051,583 | A | * | 8/1962 | Tindall ................. B65D 85/672 426/115 |
| 3,600,572 | A | * | 8/1971 | Grunwald ................. F21V 1/00 362/358 |
| 4,879,128 | A | * | 11/1989 | Morin .................... B65D 81/24 426/392 |
| 4,882,175 | A | * | 11/1989 | Ream ...................... A21C 3/06 99/450.2 |
| 5,333,658 | A | * | 8/1994 | Albion ................. B23Q 15/013 144/212 |
| 6,039,995 | A | * | 3/2000 | Zamzow ................. A23L 13/00 426/518 |
| 6,572,904 | B2 | * | 6/2003 | Rhee ....................... G01F 19/00 426/115 |
| 9,504,264 | B2 | | 11/2016 | Bauer |
| 2003/0104167 | A1 | * | 6/2003 | Spektor .................... B44C 5/00 428/136 |
| 2003/0145699 | A1 | * | 8/2003 | Kim ........................ B26D 3/10 83/13 |
| 2008/0276777 | A1 | * | 11/2008 | Blaine .................... A21C 11/10 83/401 |
| 2010/0173570 | A1 | * | 7/2010 | Reukers .................... B24C 3/04 451/91 |
| 2013/0042577 | A1 | * | 2/2013 | Magee ................... B65D 75/04 53/428 |
| 2015/0030727 | A1 | * | 1/2015 | Wollmann .............. B65B 29/08 426/122 |

OTHER PUBLICATIONS https://www.flickr.com/photos/masta/sets/72157606961361576/, 2008.*
"Halfbakery 1" Dec. 8, 2012 <web.archive.org/web/20121208102759/https://www.halfbakery.com/idea/100_20Foot_20Rolls_20of_20Bacon> (Year: 2012).*
"Halfbakery 2" Dec. 2, 2013 <web.archive.org/web/20131202122129/https://www.halfbakery.com/idea/Spiral_20Cut_20Pizza> (Year: 2013).*
"Miller Plastics" Aug. 19, 2013 youtube.com <https://www.youtube.com/watch?v=phhaGAr1xzY> (Year: 2013).*
Hagiz, Gil. "Pocket Milling" May 12, 2006. <web.archive.org/web/20060512161626/http://numeryx.com:80/cnc/pocket.htm> (Year: 2006).*
Pilinut, "How Do You "Spiral Cut" a Tenderloin?", http://www.chowhound.com/post/spiral-cut-tenderloin-911573.
Written Opinion for PCT/US2016/021684, dated May 27, 2016.
International Search Report for PCT/US2016/021684, dated May 27, 2016.

* cited by examiner

METHOD OF SPIRALLY CUTTING MEAT SLICES

CROSS REFERENCE TO RELATED APPLICATIONS

The present application incorporates by reference U.S. application Ser. No. 14/501,609, which was filed on Sep. 30, 2014. The present application claims priority to U.S. Provisional Application No. 62/130,739, filed on Mar. 10, 2015, the contents of which are incorporated herein by reference in their entirety.

BACKGROUND

Technical Field

Exemplary embodiments relate to a method for preparing and packaging meat slices. In particular, exemplary embodiments relate to a method for cutting meat slices in order to maximize the amount of meat used for a specific application (e.g., bacon, turkey bacon, beef bacon, jerky, etc.) by cutting in a spiral pattern.

Description of the Related Art

In a related art, a pork belly 1 of a pig may be cut into slices to make bacon (see FIG. 1). However, when slicing the pork belly 1 in the related art, the pork belly 1 must be cut to conform to the standard packaging size 2 of standard bacon packaging material in order to ensure that the bacon slices can fit into the standard packaging size 2 of standard bacon packaging material. Therefore, in the related art, excess pork belly 3 (as shown in FIG. 1) that is greater than the size 2 of standard bacon packaging material must be cut off and either discarded or used as lower value pork (e.g., restaurant pork belly or bacon bits). Moreover, even if the excess pork belly 3 is used as bacon bits, restaurants and consumers are not willing to pay as much for bacon bits in comparison to bacon slices.

Thus, there is a need for a method to cut the pork belly in order to maximize the amount of pork belly that can be used for bacon. There is need for a method to minimize the amount of excess pork belly 3 that gets wasted or used for lower value pork (e.g., restaurant pork belly or bacon bits). Moreover, there is a need to package the maximized bacon slices for selling to grocery stores and consumers.

SUMMARY

Exemplary implementation of the present disclosure address the problems and/or disadvantages of the related art technology described above. Although the present invention is not required to overcome all of the disadvantages described above, the exemplary implementations of the present disclosure may address the above disadvantages, and further disadvantages not described above, or may not overcome any of the problems listed above while still providing enhancement to the related art.

According to aspects of exemplary embodiments, there is provided a method for preparing meat slices in order to maximize the amount of meat able to be used for a specific application (e.g., bacon, turkey bacon, beef bacon, jerky, etc.) by cutting a meat portion in a spiral pattern. The method of cutting may comprise cutting the meat portion in a planar spiral pattern, thereby creating an elongated strip, wherein the planar spiral pattern comprises a curve on a two-dimensional plane coincident with a substantially planar surface of the meat portion.

In particular, the exemplary embodiments may provide a method for cutting pork belly in order to maximize the amount of pork belly that is used for bacon slices. The meat portion may be a pork belly having a lean side as a top face and a skinned side as a bottom face or having the lean side as the bottom face and the skinned side as the top face, and the method may be configured wherein extending directions of the first cut and the second cut are in a plane substantially parallel with both the top face and the bottom face. The meat is not limited to pork, for example, other exemplary embodiments may provide a method for cutting beef in order to maximize the amount of beef that is used for beef jerky slices or beef bacon slices. Further, exemplary embodiments may provide a method for cutting turkey in order to maximize the amount of turkey that is used for turkey bacon.

In an exemplary embodiment, there is provided a method of cutting a meat portion to make a plurality of meat slices, comprising: cutting the meat portion in a planar spiral pattern, thereby creating an elongated strip, wherein the planar spiral pattern comprises a curve on a two-dimensional plane coincident with a substantially planar surface of the meat portion.

The method of an exemplary embodiment may be further configured such that the meat portion is a pork belly having a lean side as a top face and a skinned side as a bottom face or having the lean side as the bottom face and the skinned side as the top face, and the planar spiral pattern is in a plane substantially parallel with both the top face and the bottom face.

The method of an exemplary embodiment may be further configured such that the meat slices comprise bacon slices.

The method of an exemplary embodiment may be further configured such that the cutting begins at a first point an interior of the meat portion and proceeds to a second point at an edge of the meat portion.

The method of an exemplary embodiment may be further configured such that the cutting proceeds continuously in the planar spiral pattern from the first point to the second point.

The method of an exemplary embodiment may be further configured such that the cutting begins at a first point at an edge of the meat portion and proceeds to a second point at an interior of the meat portion.

The method of an exemplary embodiment may be further configured such that the cutting proceeds continuously in the planar spiral pattern from the first point to the second point.

The method of an exemplary embodiment may be further configured such that the cutting proceeds timewise from the first point to the second point.

The method of an exemplary embodiment may further comprise cutting the elongated strip at a plurality of slicing positions to form a plurality of the meat slices.

The method of an exemplary embodiment may be further configured such that at least a first slicing position and a second slicing position of the plurality of slicing positions are such that each of the meat slices conforms to a standard meat portion slice packaging size.

According to another exemplary embodiment of the present disclosure, there is provided a method of cutting a meat portion for packaging, comprising: cutting the meat portion in a planar spiral pattern, thereby creating a coiled elongated strip, wherein the planar spiral pattern comprises a curve on a two-dimensional plane coincident with a substantially planar surface of the meat portion; and unraveling the coiled elongated strip to make an elongated meat portion.

The method of an exemplary embodiment may further comprise packaging the elongated meat portion by rolling the elongated meat portion around a paper roll.

The method of an exemplary embodiment may be further configured such that a grease barrier is disposed on at least one of a top surface and a bottom surface of the paper roll to adhere the elongated meat portion to the paper roll.

The method of an exemplary embodiment may be further configured such that meat portion comprises a pork belly.

The method of an exemplary embodiment may be further configured such that the meat portion is a pork belly having a lean side as a top face and a skinned side as a bottom face or having the lean side as the bottom face and the skinned side as the top face, and the planar spiral pattern is in a plane substantially parallel with both the top face and the bottom face.

The method of an exemplary embodiment may be further configured such that the meat slices comprise bacon slices.

According to another exemplary embodiment of the present disclosure, there is provided a method of cutting a coiled elongated meat portion to make a plurality of meat slices, the meat portion cut in a planar spiral pattern comprising a curve on a two-dimensional plane coincident with a substantially planar surface of the meat portion, the method comprising: cutting the elongated meat portion at a first slicing position; and cutting the elongated meat portion at a second slicing position more to an interior of the meat portion than the first slicing position.

The method of an exemplary embodiment may be further configured such that the meat portion is a pork belly having a lean side as a top face and a skinned side as a bottom face or having the lean side as the bottom face and the skinned side as the top face, and the planar spiral pattern is in a plane substantially parallel with both the top face and the bottom face.

The method of an exemplary embodiment may be further configured such that the meat slices comprise bacon slices.

The method of an exemplary embodiment may be further configured such that each of the first slicing position and the second slicing position are positioned such that each of the meat slices conforms to a standard meat portion slice packaging size.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION OF EXEMPLARY EMBODIMENTS

Figure 1:
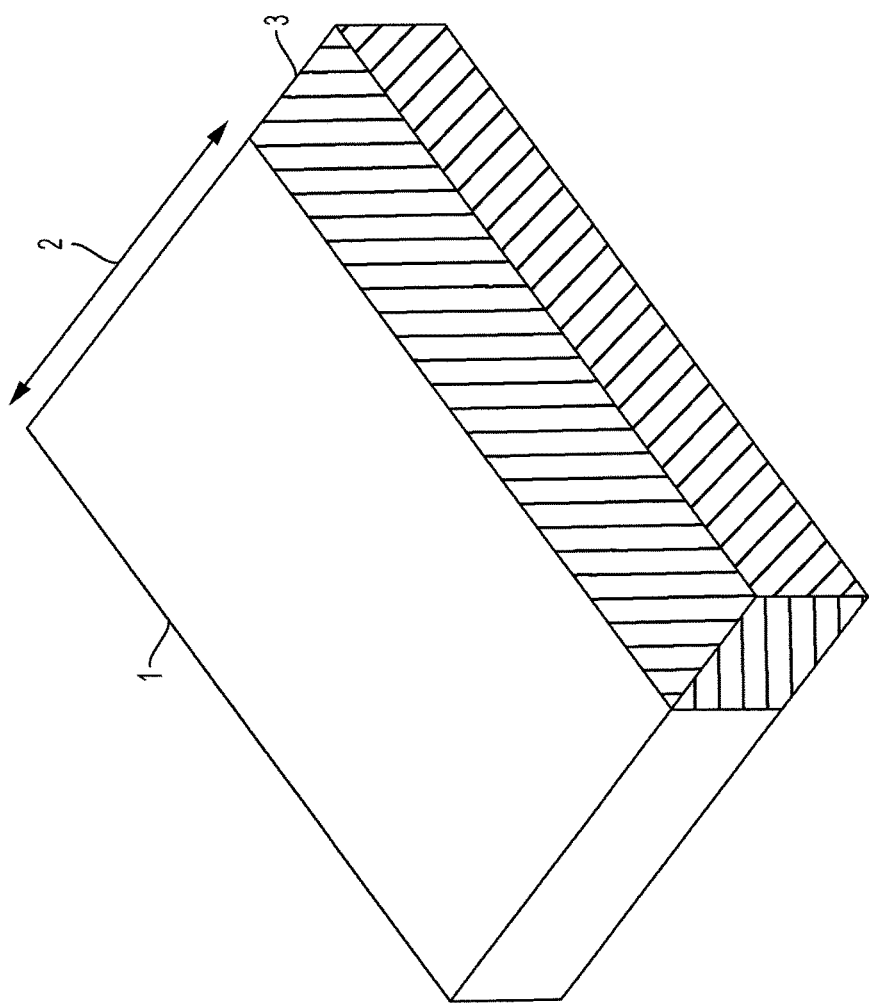
FIG. 1 is a view illustrating a related art pork belly used in the related art method of preparing bacon slices.

Hereinafter, exemplary embodiments will be described in greater detail with reference to the accompanying drawings.

In the following description, same reference numerals are used for the same elements when they are depicted in different drawings. Elements are described in detail in order to assist in an understanding of exemplary embodiments. Thus, it is apparent that exemplary embodiments may be carried out without those specifically-defined elements. Detailed descriptions of known elements are omitted for clarity and conciseness.

Figure 2:
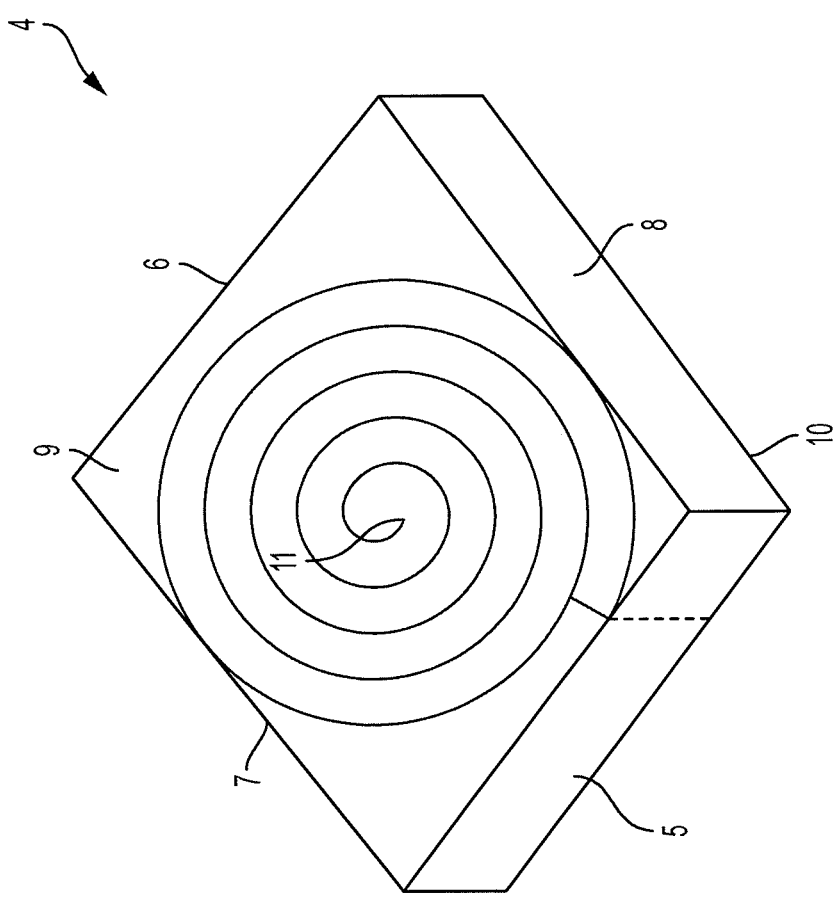
FIG. 2 is a view illustrating an exemplary embodiment of a pork belly used in a method of preparing bacon slices.

As shown in FIG. 2, a pork belly 4 may comprise a shoulder end 5, a flank end 6, a first end 7, a second end 8, a lean side 9, and a skinned side 10. Further, as shown in FIG. 2, the lean side 9 is a top face of the pork belly 4 and the skinned side 10 is a bottom face of the pork belly 4. In FIG. 2, the shoulder end 5 is a bottom side face of the pork belly 4 and the flank end 6 is a top side face of the pork belly 4. As shown in FIG. 2, the first end 7 is a left side face of the pork belly 4 and the second end 8 is a right side face of the pork belly 4. However, the exemplary embodiments are not limited, and the orientation of the pork belly 4 may be variously modified. For example, the orientation of the pork belly 4 may be modified such that the first end 7 is a right side face of the pork belly 4, the second end 8 is a left side face of the pork belly 4, the lean side 9 is the bottom face of the pork belly 4, the skinned side 10 is the top face of the pork belly 4, etc. The pork belly 4 may be cured before being cut. However, exemplary embodiments are not limited to the above description. In another exemplary embodiment, the pork belly 4 may also be raw before being cut or smoked before being cut.

Figure 3:
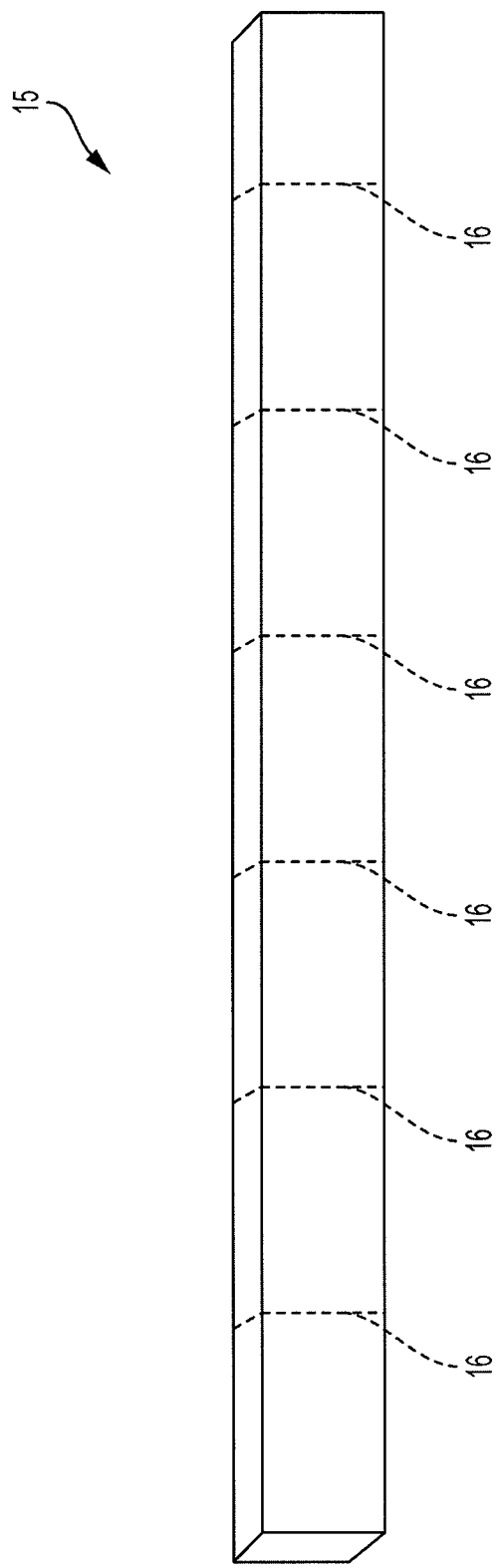
FIG. 3 is a view illustrating an exemplary embodiment of an elongated pork belly strip.

As shown in FIG. 2 of the exemplary embodiments, the pork belly 4 may be cut with a continuous cut in the pattern of a spiral. The pattern of the spiral may be a curve on a two-dimensional plane coincident with the top face of the pork belly 4 that winds around a fixed center point 11 at a continuously increasing distance from the center point. Upon completing the spiral cut, a single elongated strip 15 is produced, as shown in FIG. 3. After the elongated pork belly strip 15 has been created, various cuts 16 may be made at various positions to create bacon slices. In an exemplary embodiment, at least the first cut of the various cuts 16 may be made such that the bacon slices will conform to the standard bacon packaging size 2 (see standard packaging size 2 in FIG. 1). In an exemplary embodiment, each of the bacon slices is in a range between 6-11 inches. In a preferred embodiment, the bacon packaging size may be substantially 8 inches, or substantially 10 inches, and the slicing positions are configured such that the bacon slices are all about 8 inches, or all about 10 inches.

However, it should be noted that by first obtaining an elongated strip 15, an element of flexibility is introduced in that a standard size can be selected arbitrarily, and a plurality of meat slices confirming to the standard size can be made from the one elongated strip 15 while minimizing waste. For example, a standard size corresponding to a piece of bread, such as 4 inches, could be selected and a plurality of sandwich-sized bacon slices could be produced while minimizing waste.

Figure 4:
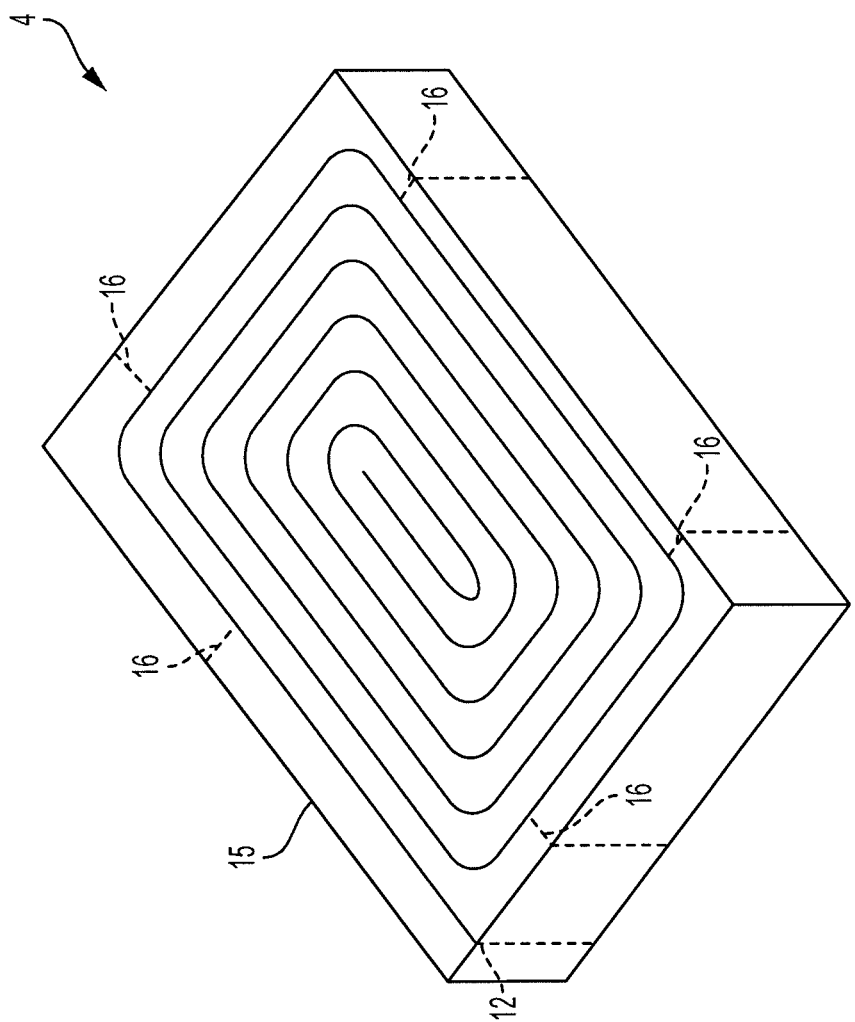
FIG. 4 is a view illustrating an exemplary embodiment of a pork belly used in a method of preparing bacon slices.

The radius of the curve of the spiral pattern need not necessarily increase at a constant rate. For example, the spiral pattern may be set to be approximately an Archimedean spiral or the involute of a circle, such that the width of the elongated strip is maintained to be constant. A benefit of such a pattern may be that the thickness of bacon slices is ensured to be uniform. However, the spiral pattern may be set in another manner where uniform thickness of the bacon slices is not required. For example, the spiral pattern may be set so that the final spiral cut shape conforms to the total area of the pork belly. FIG. 4 shows an example of a spiral pattern that substantially conforms to the total area of the pork belly 4. In such an exemplary embodiment, the thickness of the elongated strip may deviate slightly when the spiral pattern turns around corners. This may be helpful to minimize wasted product, and is useful because food products are typically sold by weight, thus slight deviations in thickness of the elongated strip may be inconsequential. In an exemplary embodiment, the thickness of the elongated strip is set to be in the range of 1/16 to 3/8 inch, preferably 1/8 to 1/4 inch. Some exemplary thicknesses of meat slices may be regular-sliced bacon which is 1/16 inch, thin-sliced bacon which is 1/32 inch, and thick-sliced bacon which is 1/8 inch.

The cut in the shape of a spiral pattern may begin at the center point of the pork belly or may begin from a point on the outside of the pork belly and work inwards. An example of cutting from the outside and working inward is shown in FIG. 4, wherein the cut start point is shown as point 12. A benefit of cutting from the outside and working inward may be that it is easier to conform the cut pattern to the overall shape of the pork belly and accommodate irregular edges. It should be noted that a typical pork belly may not have sharp, well defined corners as shown in FIG. 1, but may have rounded corners, and may even comprise irregular portions that project from the rectangular shape shown in FIG. 1. Accordingly, cutting in a spiral pattern is helpful to maximize the use of such irregular portions. Of course, it should be noted that the benefits of conforming to the shape of the pork belly may still be achieved even when cutting from the center and working outward if the spiral pattern is calculated in advance. Aside from the geometric center, the starting point of cutting the spiral pattern may also be set to another arbitrary point in the interior of the pork belly.

Figure 5:
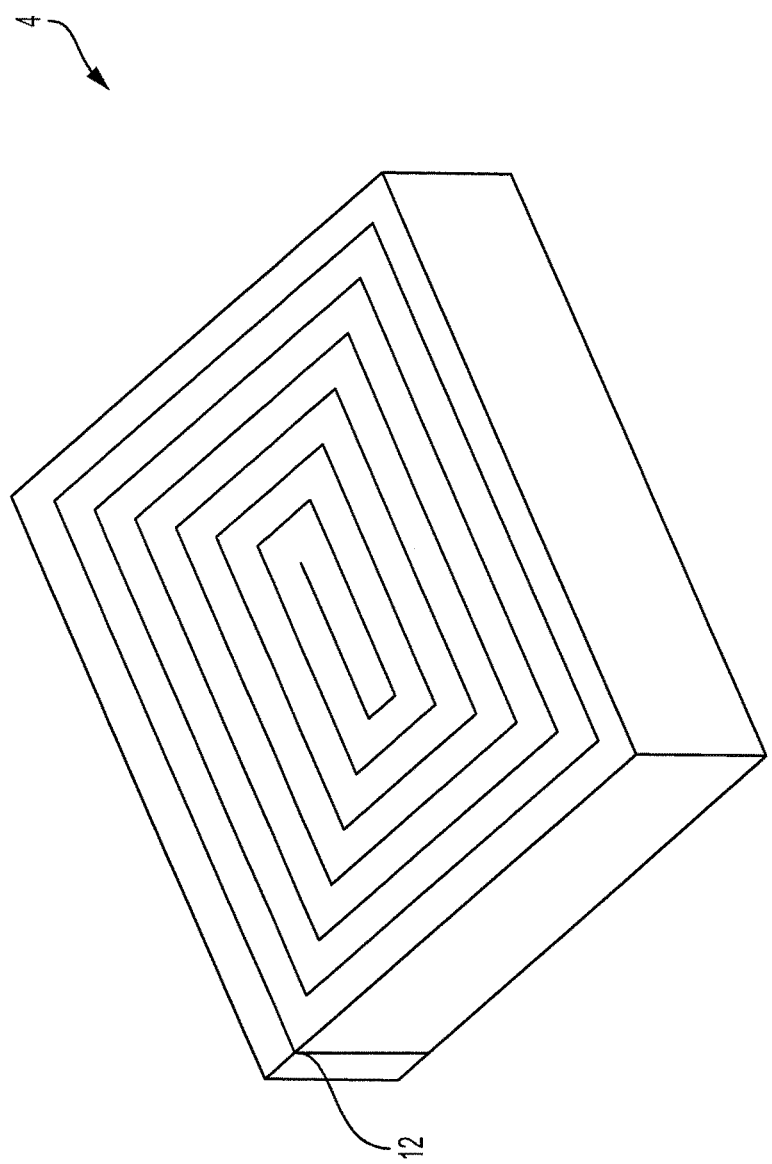
FIG. 5 is a view illustrating an exemplary embodiment of a pork belly used in a method of preparing bacon slices.

Furthermore, the shape of spiral pattern need not necessarily be a smooth curve. For example, the spiral pattern may be a substantially rectangular pattern where extending directions of cuts are at substantially right angles to one another and lengths of the cuts gradually decrease as the spiral progresses, as shown in FIG. 5.

Cutting the pork belly in exemplary embodiments may be accomplished by a water jet. A water jet is useful for its versatility and because it minimizes waste. For example, a traditional blade or saw causes material to be wasted due to the kerf of the blade or saw, but such waste can be reduced when using a water jet. When using a water jet, it may be preferable to cut the spiral pattern from the center and work outward since the outer sides of the pork belly provide support. The cutting using the waterjet may proceed timewise, that is, the cut being made beginning at the start point and advancing continuously to the end point with respect to time.

However, other exemplary embodiments may comprise other cutting tools, such as a peeler blade, deli slicer, band saw, and knife. In the example of a water jet, the cutting tool moves along the path of the spiral pattern, however another exemplary embodiment may comprise a moving platform, such as a rotating table, and a stationary cutting tool. For example, the pork belly may be secured to a turn table and the spiral cut can then be initiated from the outside by applying a knife to the rotating pork belly, wherein the edge of the knife is substantially perpendicular to the planar shape of the pork belly. When the pork belly is spun, the cut elongated strip may be unwound as it is cut. In an exemplary embodiment, the pork belly rotates at a constant rate of rotation while being pressed against a cutting tool. The cutting tool may be set to cut the pork belly into an elongated strip with a constant thickness. For example, a peeler blade with a gap of 1/8 to 1/4 inches may be used.

It should be noted that the cutting process described above differs from that conventionally applied to what is commonly referred to as "spirally sliced ham". For example, a spiral sliced ham may be prepared by fixing a ham to a rotating platform causing the ham to rotate about an axis parallel to the bone while a cutting tool is applied to the ham and moves along the axis parallel to the bone as the ham spins. The pattern of the cut in spiral ham slicing is thus actually in the shape of a cylindrical helix. In contrast to a helix, the spiral cut of an exemplary embodiment of the instant application may be a planar spiral made in the plane of the pork belly.

It is important to note that bacon slices obtained from a pork belly typically comprise several long layers of fat running parallel to lean layers. For example, "streaky bacon" comes from the pork belly and contains layers of fat, interspersed together with meaty portions, which liquefies and contributes to flavoring when cooked. Furthermore, customers are accustomed to a particular appearance of a bacon product, for example, having striations of fat and meat. By cutting a pork belly in a planar spiral pattern in exemplary embodiments such that the planar spiral pattern comprises a curve on a two-dimensional plane coincident with a substantially planar surface of the pork belly, bacon can be obtained having long layers of fat running parallel to meat. In an exemplary embodiment, the curve of the spiral pattern is on a two-dimensional plane substantially parallel with the top face and/or the bottom face of the pork belly.

Furthermore, in additional exemplary embodiments, after the elongated pork belly strip 15 has been created by being cut in the shape of a spiral, the various cuts 16 made to create individual bacon slices may be made while the pork belly is still in a coiled state. For example, after cutting the spiral shape shown in FIG. 4, a cutting tool such as a water jet can make the various cuts 16 directly, that is, without uncoiling the cut pork belly. It should be noted that the cutting pattern could combine the spiral cut and the various cuts 16 such that the overall cutting process is optimized. Additionally, while the above exemplary embodiments have discussed a cut, it is to be understood that a plurality of separate cuts may be made to create the spiral pattern.

Next, exemplary embodiments related to storage and packaging shall be discussed.

Figure 6:
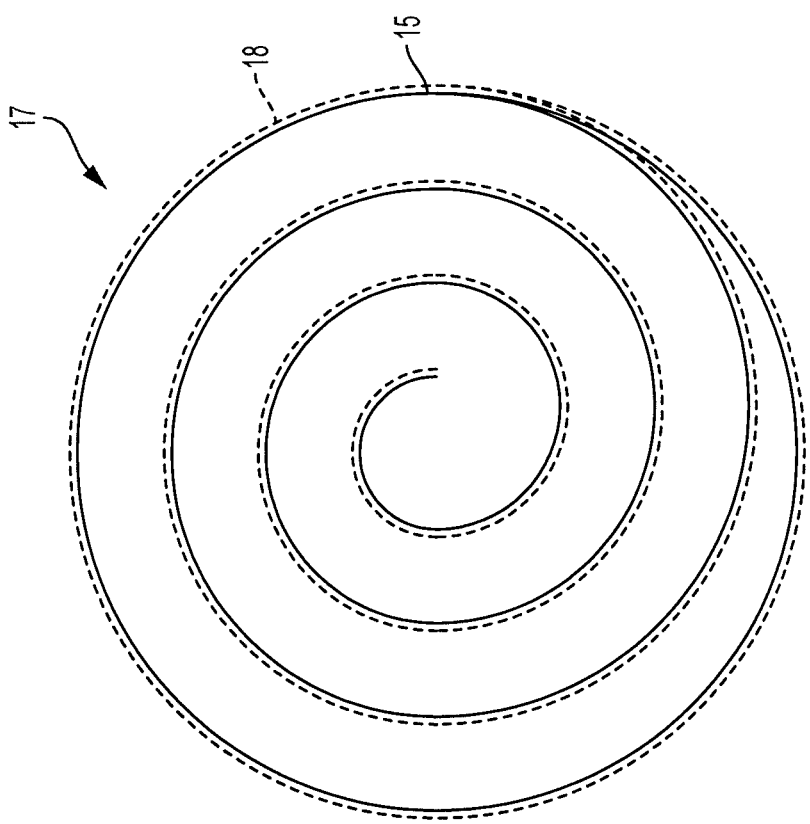
FIG. 6 is a view illustrating an exemplary embodiment of a packaging of the elongated pork belly strip in FIG. 3.

In another exemplary embodiment shown in FIG. 6, the elongated pork belly strip 15 can be rolled or spun around a paper roll 18. In this exemplary embodiment, various cuts 16 are not made at the various positions of the elongated pork belly strip 15. Therefore, as shown in FIG. 6, the elongated pork belly strip 15 is rolled or spun around the paper roll 18 to form a circular roll 17. The elongated pork belly strip 15 can be packaged for sale in this configuration. In an exemplary embodiment, the elongated pork belly strip 15 may be cooked before being rolled or spun around the paper roll 18. However, exemplary embodiments are not limited. In another exemplary embodiment, the elongated pork belly strip 15 may be cooked after being rolled or spun around the paper roll 18.

In FIG. 6 of the exemplary embodiments, various types of paper rolls can used, including a special type of paper used for adhering to the elongated pork belly strip 15. The special type of paper used for adhering to the elongated pork belly strip 15 may comprise a grease barrier (not shown). The grease barrier may be placed on both sides of the paper roll 18. The grease barrier may comprise a wax paper, thick layer of paper, etc. Therefore, the special type of paper used for adhering to the elongated pork belly strip 15 may be thicker than paper rolls in the related art.

In an exemplary embodiment including the application of a paper roll, first a spiral cut is made to obtain the elongated pork belly strip 15. Then, the elongated pork belly strip is uncoiled. Next, a paper sheet is placed on the elongated pork belly strip 15 and the elongated pork belly strip 15 is re-coiled. At this stage, the coiled pork belly strip can be further sliced into smaller pieces by a cutting tool, such as a water jet, thereby producing a sliced roll with the paper roll 18 interposed between bacon slices. The water jet is useful in this case since it can slice the elongated strip from the top surface. A benefit of this exemplary embodiment may be that individual bacon slices can be taken off the outside of the roll as it is gradually uncoiled.

The coiling and uncoiling of the elongated pork belly strip 15 may be assisted by the use of a take-up reel. Furthermore, the application of the paper roll 18 may be done as the elongated pork belly strip 15 is taken up on the reel.

Although exemplary embodiments have been described using pork belly to create bacon slices, exemplary embodiments are not limited. In fact, the method of spirally cutting meat slices may comprise the method for preparing jerky. As jerky can be made from various animals including bovine, pork, goat, mutton, lamb, deer, elk, caribou, kudu, springbok, kangaroo, bison, moose, turkey, ostrich, salmon, alligator, tuna, emu, horse, and camel, the method for preparing jerky will include all of these various animals. However, the method for preparing jerky may also include other various animals that would be apparent to one of ordinary skill in the art. The method for preparing jerky may include jerky slices (similar to bacon slices) and/or jerky rolled or spun around a paper roll (similar to the elongated pork belly strip 15 rolled or spun around the paper roll 18).

Although exemplary embodiments have been described using pork belly to create bacon slices, the method of spirally cutting meat slices may comprise a method for preparing bacon from other various animals. In fact, as bacon may be made from various other animals including beef, lamb, chicken, goat, and turkey, the method for preparing bacon will include all of these various animals. However, the method for preparing bacon may also include other various animals that would be apparent to one of ordinary skill in the art. In an exemplary embodiment, the method for preparing turkey bacon may include turkey bacon slices (similar to bacon slices from pork belly) and/or turkey bacon rolled or spun around a paper roll (similar to the elongated pork belly strip 15 rolled or spun around the paper roll 18).

According to exemplary embodiments, it becomes possible to efficiently prepare meat slices while maximizing the amount of meat that can be used for a specific application, such as bacon slices, and minimizing the amount of waste.

The foregoing description of the exemplary embodiments is intended to be illustrative. Many alternatives, modifications, and variations will be apparent to those skilled in the art. Descriptions and features listed in relation to the foregoing exemplary embodiments are not to be construed as limiting the present inventive concept, the scope of which is defined by the following claims.

What is claimed is:

1. A method of cutting a meat portion for packaging, comprising:
performing a first cutting process, the first cutting process comprising cutting the meat portion in a planar spiral pattern, thereby creating a coiled elongated strip that comprises an entirety of the meat portion, wherein the planar spiral pattern comprises a curve on a two-dimensional plane coincident with a substantially planar surface of the meat portion;
unraveling the coiled elongated strip to make an elongated meat portion;
packaging the elongated meat portion by rolling the elongated meat portion around a paper roll such that the elongated meat portion, with the paper roll, is re-coiled into the planar spiral pattern; and
performing a second cutting process, the second cutting process consisting of cutting, while the elongated meat portion with the paper roll is in the planar spiral pattern after being re-coiled into the planar spiral pattern, the elongated meat portion into a plurality of meat slices, such that the plurality of meat slices and the paper roll remain in a single roll,
wherein the first cutting process cuts the meat portion in the planar spiral pattern to create the coiled elongated strip that comprises the entirety of the meat portion, such that the meat portion includes straight portions that extend straight and have a constant width, in a width direction parallel to the two-dimensional plane and perpendicular to an extending direction which is a direction in which the meat portion spirals in the planar spiral pattern, and the meat portion further includes corner portions, connecting the straight portions, that have a width in the width direction that is different from the width of the straight portions in the width direction.

2. The method of claim 1, wherein
a grease barrier is disposed on at least one of a top surface and a bottom surface of the paper roll to adhere the elongated meat portion to the paper roll.

3. The method of claim 1, wherein
the meat portion is a pork belly having a lean side as a top face and a skinned side as a bottom face or having the lean side as the bottom face and the skinned side as the top face, and
the planar spiral pattern is in a plane substantially parallel with both the top face and the bottom face.

4. The method of claim 3, wherein the meat slices comprise bacon slices.

5. The method of claim 3, wherein the cutting the meat portion in the planar spiral pattern of the first cutting process comprises cutting through an entire thickness of the meat portion, wherein the thickness is from the top face to the bottom face.

* * * * *